United States Patent [19]

Trammell, Jr.

[11] Patent Number: 5,415,422

[45] Date of Patent: May 16, 1995

[54] RIDER PROPELLED VEHICLE DRIVE ASSEMBLY

[75] Inventor: Earl M. Trammell, Jr., Chesterfield, Mo.

[73] Assignee: Equi-Cycle Corporation, Chesterfield, Mo.

[21] Appl. No.: 229,618

[22] Filed: Apr. 19, 1994

[51] Int. Cl.⁶ .......................... B62M 1/02; B62M 1/10
[52] U.S. Cl. .................................. 280/259; 74/68; 74/69; 74/594.1; 280/217; 474/112
[58] Field of Search ............... 280/259, 260, 261, 262, 280/212, 217, 236; 74/66, 68, 69, 594.1; 474/112

[56] References Cited

U.S. PATENT DOCUMENTS

| | | |
|---|---|---|
| 92,132 | 6/1869 | Westphal et al. . |
| 242,310 | 5/1881 | Harrison . |
| 280,927 | 7/1883 | Hays . |
| 328,709 | 10/1885 | Paessler .................. 280/212 |
| 567,629 | 9/1896 | Young ..................... 280/215 |
| 642,758 | 2/1900 | Runge ................... 280/226.1 |
| 704,377 | 7/1902 | Rieber ................... 280/226.1 |
| 740,156 | 9/1903 | Mendenhall ............. 74/594.1 |
| 868,329 | 10/1907 | Corbitt .................... 280/215 |
| 1,480,871 | 1/1924 | Tiffin ....................... 280/256 |
| 1,564,548 | 12/1925 | Ford ...................... 280/1.192 |
| 1,677,017 | 7/1928 | Boardman ................ 280/215 |
| 1,707,618 | 4/1929 | Keogh ..................... 280/215 |
| 1,867,731 | 7/1932 | Clarke ..................... 280/215 |
| 1,981,737 | 11/1934 | McIlwain .................. 280/223 |
| 2,141,233 | 12/1938 | Alexander ................ 280/217 |
| 2,481,683 | 9/1949 | Polacek ................... 280/256 |
| 2,638,359 | 5/1953 | Crumble .................. 280/215 |
| 3,403,927 | 10/1968 | Rettger Jr. .............. 280/261 |
| 3,664,684 | 5/1972 | Long ....................... 280/231 |
| 3,779,099 | 12/1973 | Trammell Jr. ........... 74/594.3 |
| 3,906,807 | 9/1975 | Trammell Jr. .............. 74/143 |
| 4,029,334 | 6/1977 | Trammell Jr. ........... 280/261 |
| 4,108,459 | 8/1978 | Alvigini .................... 280/215 |
| 4,133,550 | 1/1979 | Brown ..................... 280/210 |
| 4,159,652 | 7/1979 | Trammell Jr. .............. 74/117 |
| 4,327,929 | 5/1982 | Melzian ................... 280/282 |
| 4,416,464 | 11/1983 | Mattox .................... 280/215 |
| 4,548,421 | 10/1985 | Wiener . |
| 4,632,414 | 12/1986 | Ellefson .................. 280/246 |
| 4,634,137 | 1/1987 | Cocksedge .............. 280/256 |
| 4,708,356 | 11/1987 | Levavi .................... 280/255 |
| 4,772,252 | 9/1988 | Bóna ......................... 74/69 |
| 5,035,678 | 7/1991 | Hageman ................. 474/50 |
| 5,188,003 | 2/1993 | Trammell Jr. .......... 74/594.3 |

FOREIGN PATENT DOCUMENTS

| | | | |
|---|---|---|---|
| 565863 | 4/1958 | Belgium ................. 74/594.3 |
| 670559 | 11/1929 | France .................. 74/594.1 |
| 978498 | 11/1950 | France .................. 74/594.3 |
| 1078044 | 11/1954 | France ................... 280/267 |
| 94319 | 12/1896 | Germany .............. 74/594.3 |
| 2922691 | 12/1980 | Germany . |
| 432859 | 3/1948 | Italy ....................... 280/256 |
| 244783 | 9/1946 | Switzerland .......... 74/594.3 |
| 4817 | 10/1883 | United Kingdom ..... 280/253 |

Primary Examiner—Mitchell J. Hill
Attorney, Agent, or Firm—Senniger, Powers, Leavitt & Roedel

[57] ABSTRACT

A rider propelled vehicle includes a frame having a hub portion. Each of two cranks has a crank shaft extending into the hub portion and mounted on the hub portion for rotation relative thereto independent of the other crank shaft. Both of the cranks can be rotated through a top dead center position and a bottom dead center position in which the force applied by the rider to the crank for propulsion of the vehicle is at a minimum. An output shaft extending from within the hub portion is operatively connected to a drive wheel of the vehicle for driving rotation of the drive wheel to propel the vehicle. The output shaft is mounted on the hub portion for rotation relative to the frame and the cranks. A torque transmission assembly interconnecting the output shaft with the crank shafts for transmitting torque from the crank shafts to the output shaft is contained within the frame. The torque transmission assembly is constructed such that the cranks are accelerated and decelerated relative to each other whereby the cranks never simultaneously occupy their top and bottom dead center positions.

20 Claims, 8 Drawing Sheets

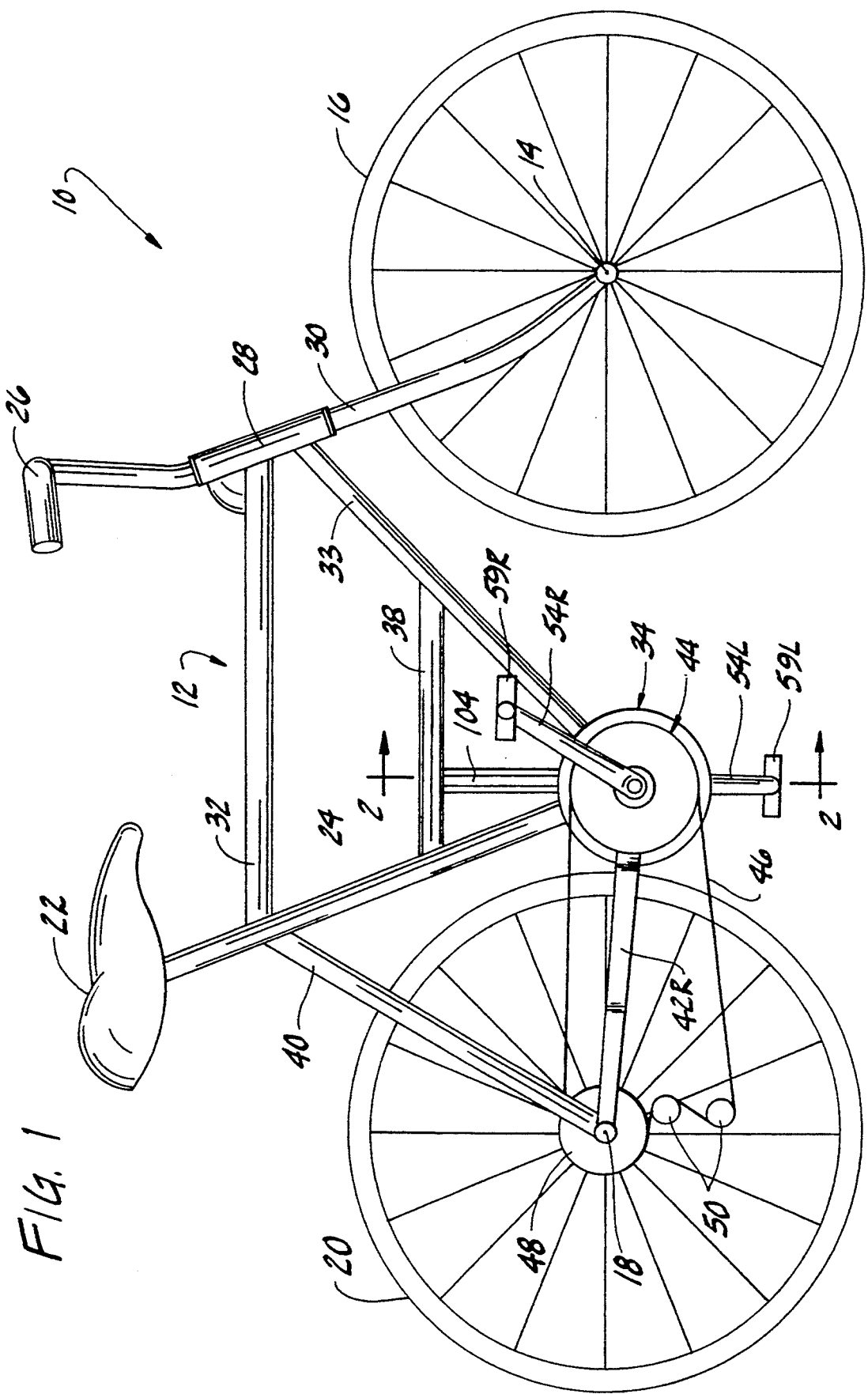

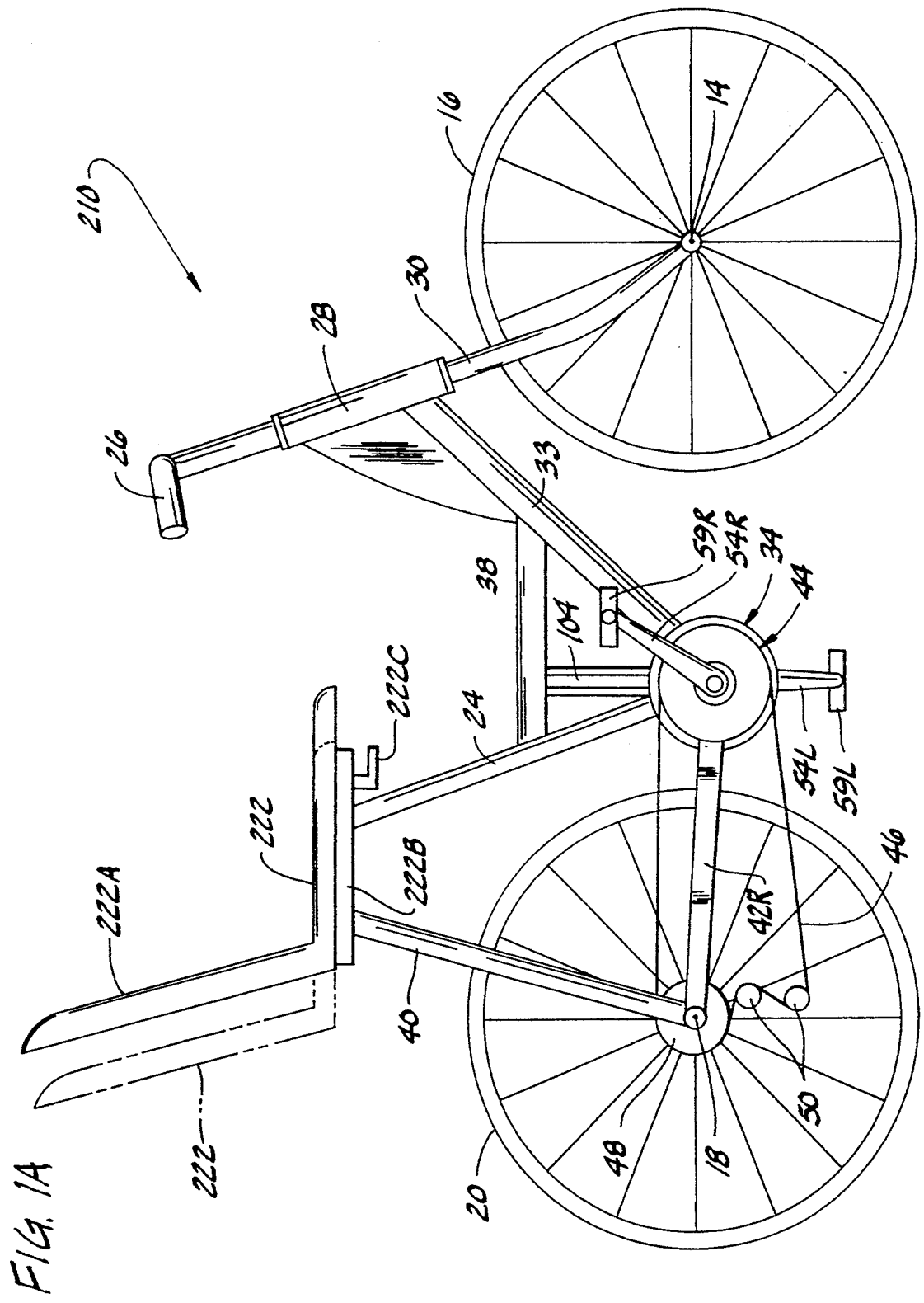

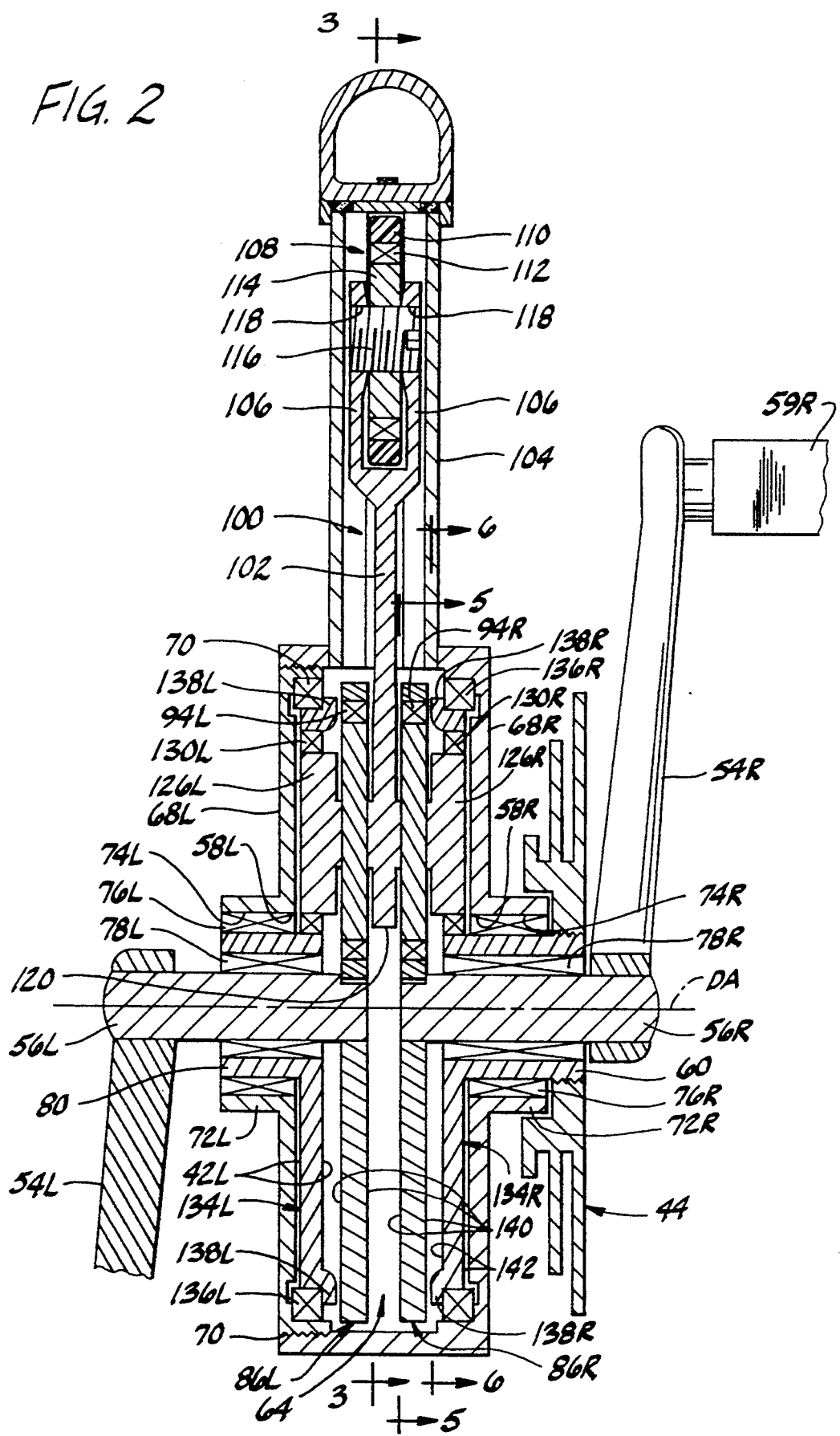

RIDER PROPELLED VEHICLE DRIVE ASSEMBLY

BACKGROUND OF THE INVENTION

This invention relates generally to rider propelled vehicles and more particularly to a drive assembly for rider propelled vehicles.

Rider propelled vehicles (e.g., bicycles, tricycles and the like) are universally driven drive assemblies having a pair of cranks rotated about an axis by pedalling action of the rider's legs. Pedals may be mounted directly on the cranks, or indirectly connected to the cranks by of connector rods, such as when reciprocating pedalling action is employed. Typically, the cranks of the drive assembly are fixed on opposite ends of a shaft and permanently located 180° apart. A well known drawback to the typical configuration is that the cranks will simultaneously occupy top and bottom "dead center positions" in which only a very low torque is applied to the crank shaft. More specifically, at the beginning of the power stroke of each of the rider's legs (that is, when the leg begins to be extended by the rider from a flexed position), force applied by the rider's leg to the crank tends to be directed through or very near the axis of rotation of the crank shaft. The other leg provides no assistance because it is fully or nearly fully extended and any force applied by that leg would also be directed along a line at or near the axis of rotation. As a result, a very low torque is generated by the drive assembly.

Low torque application is particularly troublesome when first initiating motion of the vehicle and when travelling up steep grades at low speeds. The rider may attempt to overcome this by pushing the vehicle until the cranks move out of their dead center positions, or by changing his body's position on the bicycle so that the force applied by his legs is directed along a line spaced further from the axis of rotation. Either of these solutions is inconvenient for any rider and nearly impossible for some riders who have sufficient leg strength to propel the bicycle but through age or handicap find it difficult to change the position of their bodies. In part to facilitate changing body position, bicycle seats have been located relatively high and almost directly above the pedals. Because of the location of the seat relative to the pedals and need to change body position, back rests are not employed. The absence of a reaction surface, such as could be provided by a back rest, limits the force the rider can apply to the cranks.

The problem of the top and bottom dead center positions is acute when reciprocating motion is employed to power the drive assembly. In that event, the cranks are connected by rods to pedals driven in reciprocating, rather than rotary fashion. The rods fix the direction by which forces may be applied to the cranks. Thus, the top dead center position cannot be overcome by the rider changing his body position.

Prior solutions to this problem are disclosed in my U.S. Pat. Nos. 3,779,099, 3,906,807, 4,029,334 and 4,159,652. Generally, the solution disclosed in these patents is to provide two cranks on each side of the vehicle, a drive crank fixedly connected to the sprocket and a pedal crank connected to the pedals (via connector rods in the case of reciprocating motion). These cranks are interconnected by a torque transmission assembly which causes the pedal crank to be accelerated and decelerated relative to the drive crank during each orbit of the drive crank about its axis of rotation. The pedal cranks on each side of the vehicle are also accelerating and decelerating with respect to each other such that they are no longer constantly maintained at 180° separation. Thus, when one of the pedal cranks is at its bottom dead center position the other pedal crank is separated by less than 180° (measured in the direction of rotation of the pedal cranks) so that the other pedal crank does not simultaneously occupy its top dead center position. Therefore, the rider is able to apply a substantial torque to the drive assembly throughout each rotation of the pedal cranks without changing his body position.

My prior inventions operate in a satisfactory manner to eliminate the problem of the top (and bottom) dead center position in the drive assemblies of rider propelled vehicles. However, I have found it desirable to improve upon certain aspects of these inventions. In each of my prior inventions, the torque transmission assembly is exposed to the environment which could result in the various cams and bearings of the assembly becoming fouled with dirt, grease and other debris, or could subject the assembly to damage by impact. Some of my prior inventions (e.g., those disclosed in U.S. Pat. Nos. 4,029,334 and 4,159,652) employ cam followers moving in a cam raceway. The sliding action of the cam follower in the cam raceway may result in wearing of the follower and raceway unless more expensive materials are used.

The exposed disposition of the torque transmission assembly causes a bicycle to have an unusual appearance which may frighten off the ordinary bicycle rider for whom the inventions may provide the greatest advantage. Further in some instances (e.g., U.S. Pat. No. 4,159,652), the result is achieved by separating the axis of rotation of the pedal cranks from that of the drive cranks, which also gives the drive assembly a nonstandard appearance.

SUMMARY OF THE INVENTION

My new invention introduces a new drive assembly for self propelled vehicles that eliminates the common top (and bottom) dead center position problem inherent in crank driven bicycles and other rider propelled vehicles. My improved drive assembly further requires only moderate changes in present bicycle frame design, but will permit the seat location to be moved down and to the rear of the pedals in a more comfortable location. More specifically, this invention incorporates the drive assembly within the hub portion of the frame of the bicycle to control the pedal action. Specifically, it controls the pedal action so that when one pedal is at a bottom dead center position, the opposite pedal will always be at a selected number of degrees past its top dead center position where the rider can apply a substantial torque to the drive assembly.

The advantages of this new drive assembly are positive and effective. The drive assembly will eliminate the inefficient pedal effort extended over the top dead center position that is inherent in conventional bicycles and will make overall pedalling more efficient. Beneficial frame changes can be made due to the elimination of the problem of the top and bottom dead center positions. The seat can be located slightly lower and more to the rear (with respect to the pedals), and a high back rest on the seat may be used. These changes will increase the comfort for the rider, and the high back rest will allow the rider to apply a greater force to the drive assembly.

In addition, the elimination of the top dead center position will permit the use of reciprocating pedal motion (which is a more natural motion for the rider's legs). Reciprocating action is almost never used today because of the acute problem of the top and bottom dead center positions.

This invention will provide for easier and more efficient pedalling together with more riding comfort. Accordingly, it should have a strong appeal to the millions around the world who ride a bicycle every day as a means of transportation.

Among the several objects and features of the present invention may be noted the provision of a rider propelled vehicle with a drive assembly with pedal cranks which never simultaneously occupy their respective top and bottom dead center positions; the provision of such a vehicle on which the rider may sit comfortably in one location to pedal the vehicle; the provision of such a vehicle in which the drive assembly is protected from dirt, grease and other debris; the provision of such a vehicle in which the drive assembly is shielded from direct impact; the provision of such a vehicle in the form of a bicycle in which the visible portion of the drive assembly appears substantially the same as conventional bicycles; and the provision of such a bicycle having a conventional lateral spacing of the pedals.

Further among the several objects and features of the present invention may be noted the provision of a drive assembly for a rider propelled vehicle which permits smooth and efficient pedalling action by the rider over all kinds of grades; the provision of a drive assembly which when employed on a bicycle requires little modification to standard existing frame designs; the provision of such a drive assembly which is durable; and the provision of such a drive assembly which is easy to manufacture and assemble.

Generally, a rider propelled vehicle constructed according to the principles of the present invention comprises a frame including a hub portion having two openings therein. At least two wheels are mounted on the frame for rotation relative thereto, one of the two wheels being a drive wheel. Each of two cranks has a crank shaft extending into the hub portion through a respective one of the openings, and mounted on the hub portion for rotation relative thereto independent of the other crank shaft. Both of the cranks can be rotated through a top dead center position and a bottom dead center position in which the force applied by the rider to the crank for propulsion of the vehicle is at a minimum. An output shaft extending from within the hub portion through one of the openings in the hub portion is operatively connected to the drive wheel for driving rotation of the drive wheel to propel the vehicle. The output shaft is mounted on the hub portion for rotation relative to the hub portion and the cranks. A torque transmission assembly interconnecting the output shaft with the crank shafts for transmitting torque from the crank shafts to the output shaft is contained within the frame. The torque transmission assembly is constructed such that the cranks are accelerated and decelerated relative to each other whereby the cranks never simultaneously occupy their top and bottom dead center positions.

Other objects and features of the present invention will be in part apparent and in part pointed out hereinafter.

BRIEF DESCRIPTION OF THE DRAWINGS

FIG. 1 is a diagrammatic elevation of a bicycle having a drive assembly of the present invention;

FIG. 1A is a diagrammatic elevation of a bicycle of a second embodiment having the drive assembly of the present invention;

FIG. 2 is a fragmentary vertical section taken in the plane including line 2—2 of FIG. 1 and showing the drive assembly;

Corresponding reference characters indicate corresponding parts throughout the several views of the drawings.

DETAILED DESCRIPTION OF THE PREFERRED EMBODIMENTS

Figure 3:
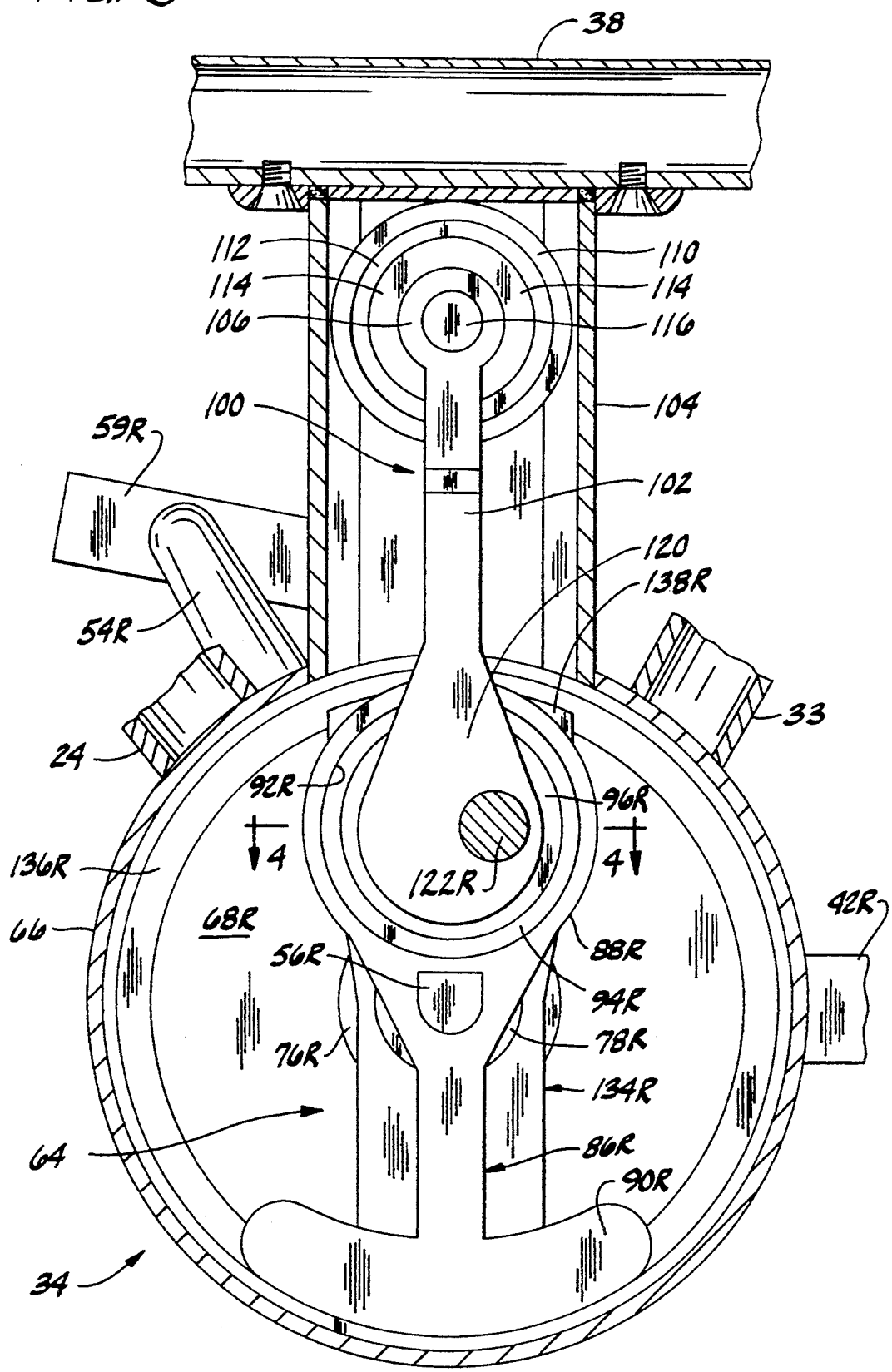
FIG. 3 is a fragmentary vertical section taken in the plane including line 3—3 of FIG. 2.

Referring now to the drawings, and in particular to FIGS. 1 and 2, a rider propelled vehicle in the form of a bicycle indicated generally at 10 is shown to comprise a frame (designated generally by reference numeral 12) mounting for rotation on a front axle 14 a front wheel 16 and on a rear axle 18 a rear drive wheel 20. Except as described hereinafter, the bicycle 10 is of generally conventional construction, having a seat 22 mounted on a center post 24 of the frame and handle bars 26 mounted in a sleeve portion 28 of the frame for steering the front wheel 16. A fork 30 connected to the handle bars 26 and extending below the sleeve portion is attached to the front axle 14. The sleeve portion 28 is connected to the center post 24 by an upper horizontal member 32 and to a hub portion (generally indicated at 34) by a front angled frame member 36. A lower horizontal frame member 38 extends between the front angled frame member 33 and the center post 24. The drive wheel 20 is connected to the frame 12 by a rear angled frame member 40 extending upward to the center post 24. Left and right struts are designated, 42R, 42L, respectively (only the right strut being shown in FIG. 1), and are connected between the rear axle 18 and the hub portion 34.

A sprocket gear (generally indicated at 44) mounted on the right side of the hub portion 34 of the frame 12 of the bicycle 10 is connected to by an endless chain 46 enmeshed with the sprocket gear, a smaller sprocket gear 48 mounted on the rear axle 18, and idler gears 50. As shown in FIG. 2, a right crank and a left crank (indicated in their entireties by reference numerals 54R and 54L, respectively) each have crank shafts (designated 56R, and 56L, respectively) extending into the hub portion 34 through respective openings (designated 58R and 58L, respectively) on opposite sides of the hub portion. The structure of the present invention includes many corresponding parts associated with the right crank 54R and left crank respectively. Such parts will be designated by the same reference numeral with the addition of the suffix "R" for those parts associated with the right crank and the suffix "L" for those associated with the left crank. The construction and operation of the corresponding parts is generally the same so that a description of the construction and operation of a part associated with one of the cranks will apply equally to a part associated with the other of the cranks.

The right crank 54R and left crank 54L are each mounted on the hub portion 34 for rotation independent of the other crank about a common drive axis DA. Pedals 59R, 59L pivotally mounted on the laterally outer ends of the cranks 54R, 54L are engageable by the rider's feet (not shown) for applying a motive force to the cranks. The cranks 54R, 54L are each rotatable through a top dead center position and a bottom dead center position in which the force applied by the rider to the crank for propulsion of the bicycle 10 is at a minimum. The left crank 54L is shown in its bottom dead center position in FIG. 1, and corresponds to the bottom dead center position of the right crank 54R. The top dead center position of the left crank 54L (not shown) is 180° opposite the bottom dead center position, or a substantially vertically upward position, and also corresponds to the top dead center position of the right crank 54R. In actual practice the top and bottom dead center position may differ from precisely vertical, depending, for instance, on the position of the rider's body relative to the cranks 54R, 54L. Thus, the description of the top and bottom dead center positions herein is illustrative only.

As shown in FIG. 2, an output shaft 60 extending from within the hub portion 34 through the right opening 58R in the hub portion is fixedly attached as by threaded connection to the sprocket gear 44. The right crank 54R and left crank 54L are interconnected with the output shaft 60 by a torque transmission assembly, generally indicated at 64, which transmits torque from the cranks to the output shaft. The torque transmission assembly 64 is contained entirely within the frame 12. As described in more detail hereinafter, the torque transmission assembly 64 is constructed so that the right crank 54R and left crank 54L are accelerated and decelerated relative to each other as they rotate about the drive axis DA whereby the cranks never simultaneously occupy their top and bottom dead center positions.

The hub portion 34 of the frame 12 includes a short, cylindrical tube 66, a generally thin, circular, right cover 68R closing a right end of the tube and a generally thin, circular, left cover 68L closing a left end of the tube. In the illustrated embodiment, the right cover 68R is formed as one piece with the tube 66, and the left cover 68L is connected to the tube by threads 70 formed on the left cover and left end of the tube. This construction permits the insertion of the torque transmission assembly 64 into the hub portion 34 during manufacture. The right and left covers 68R, 68L each have a generally central opening constituting one of the two openings 58R, 58L of the hub portion 34 identified previously. Annular flanges 72R, 72L extending around the perimeter of the openings 58R, 58L project laterally outwardly from the covers 68R, 68L, and have inner, cylindrical mounting surfaces. The output shaft 60 is generally tubular in shape and is mounted by a bearing 76 on the inner surface 74R of the annular flange 72R of the right cover 68R. The right crank shaft 56R is mounted concentrically within the tubular output shaft 60 by a bearing 78 so that both rotate about the drive axis DA. The drive axis coincides with the longitudinal axes (not shown) of the crank shafts 56R, 56L and the output shaft 60. Thus, the inner surface 74R of the right cover 68R bears both the output shaft 60 and the crank shaft 56R. The left crank 54L is mounted in the same fashion, the only difference being that the crank shaft 56L is mounted by a bearing 82 within a tubular shaft 80 which is somewhat shorter than the output shaft 60 and is not connected to the sprocket gear 44 for driving its rotation.

Figure 5:
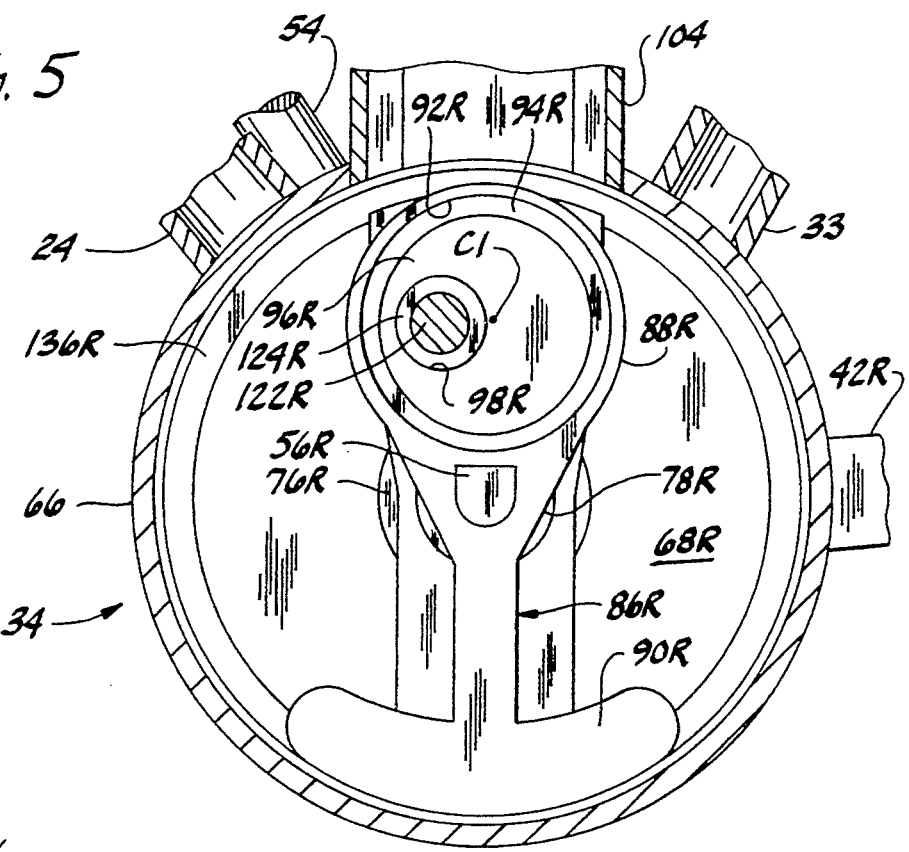
FIG. 5 is a fragmentary vertical section taken in the plane including line 5—5 of FIG. 2.

Referring now to FIGS. 2, 3, 5 and 6, an input member (designated generally by reference numeral 86R) of the torque transmission assembly 64 is mounted on the inner end of the right crank shaft 56R for conjoint rotation with the crank shaft about the drive axis DA. As shown in FIG. 5, the input member 86R includes a generally teardrop shaped portion 88R and a counterweight portion 90R on the opposite side of the crank shaft 56R from the teardrop shaped portion. The teardrop shaped portion 88R has an opening 92R in it which receives a bearing 94R and a disk 96R mounted by the bearing for rotation about its center C1 relative to the input member 86R. The disk 96R has an eccentric opening 98R which orbits the center C1 of the disk as it rotates in the opening 92R. It is through the eccentric opening 98R that the input member 86R (and hence crank 54R) is connected to the output shaft 60 by a connector, indicated generally at 100 (FIG. 2).

Figure 4:
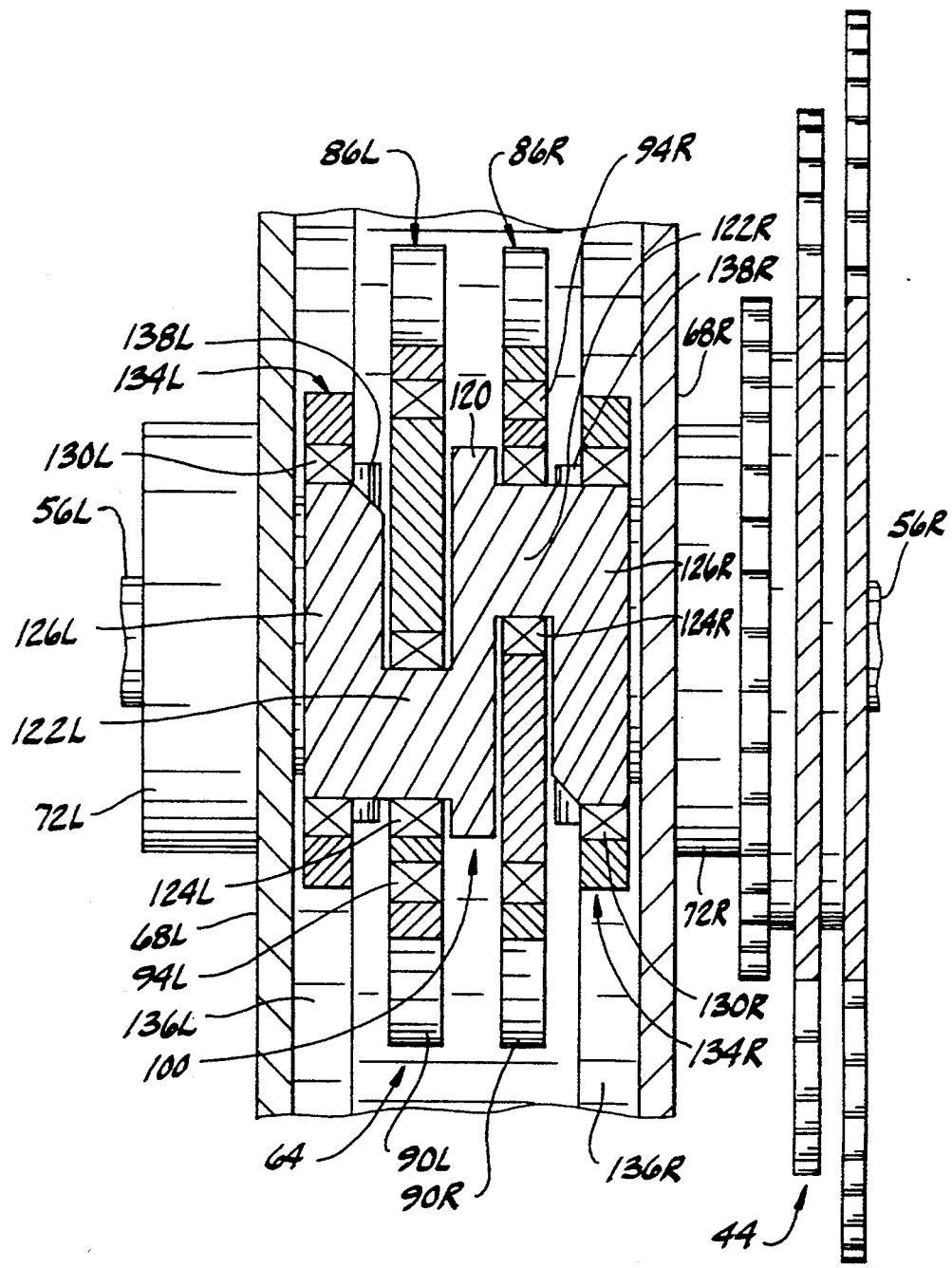
FIG. 4 is a fragmentary horizontal section taken in the plane including line 4—4 of FIG. 3.

Referring now to FIGS. 2–4, the connector 100 is shown to include an arm 102 extending from the hub portion 34 into a tubular raceway portion 104 of the frame 12 which opens into the hub portion. At its upper end inside the raceway portion 104, the arm 102 splits to members 106 defining a yoke mounting a roller generally indicated at 108. The roller includes a wheel 110 mounted by a bearing 112 on a center ring 114 attached to the yoke members 106 by a fastener 116 received in holes 118 in the yoke members (FIG. 2). The wheel 110 is engageable with interior walls of the raceway portion 104 to facilitate reciprocation of the arm 102 in the raceway portion.

Figure 6:
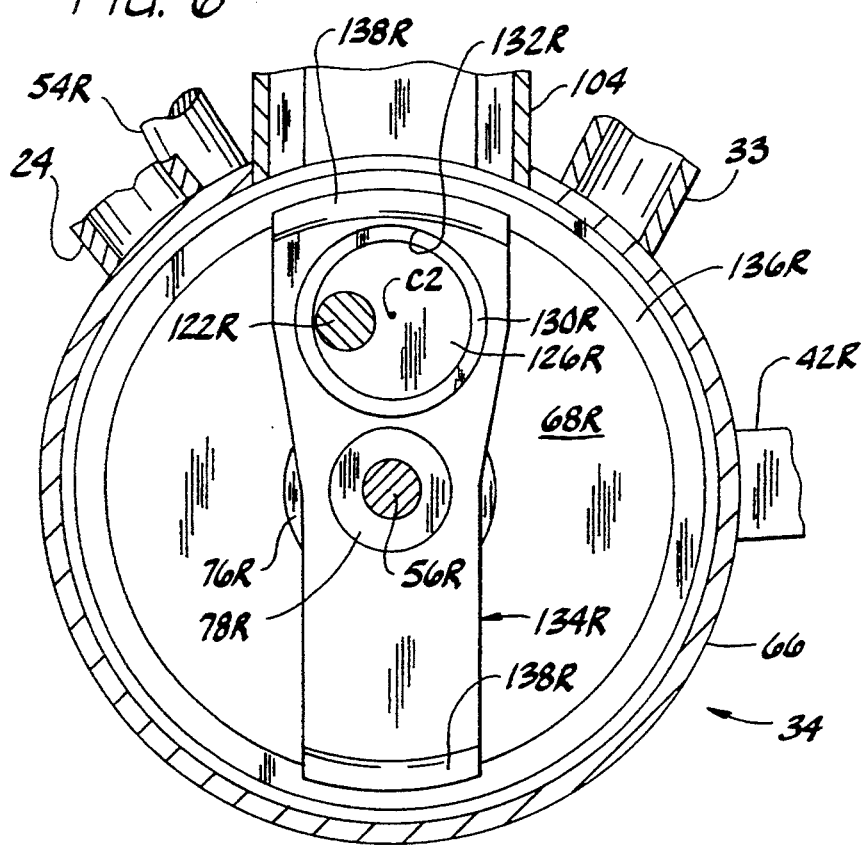
FIG. 6 is a fragmentary vertical section taken in the plane including line 6—6 of FIG. 2.

At the lower end of the arm 102, the connector 100 includes a generally teardrop shaped connector body 120 (FIG. 3) having cylindrical lugs 122R, 122L (broadly "connector portions") projecting laterally outwardly from opposite sides of the body (FIG. 4). The lugs 122R, 122L are offset from each other in a front to rear direction of the bicycle. The right lug 122R is connected to the input member 86R by a bearing 124R mounted in the eccentric opening 98R of the disk 96R of the input member. The bearing 124R connecting the lug 122R to the disk 98R and the bearing 94R connecting the disk to the input member 86R permit the lug to vary its radial distance from the drive axis DA as the input member and lug rotate about the drive axis. The lug 122R extends through the input member 86R and is fixedly connected laterally outwardly of the input member to a generally circular ear 126R at an eccentric location on the ear (FIG. 6). In the illustrated embodiment, the ears 126R, 126L and lugs 122R, 122L are formed as one piece with the connector body 120 and arm 102 so that the lugs, connector body and arm are in fixed position relative to each other.

The circular ear 126R of the connector 100 is received in a bearing 130R located in an opening 132R of an output member (generally indicated at 134R) of the torque transmission assembly 64 (FIGS. 2 and 6). As may be seen in FIG. 2, the output member 134R is formed as one piece with the output shaft 60 and rotates conjointly with the output shaft about the drive axis DA. The bearing 130R permits the ear 126R to turn about its center C2 relative to the output member 134R as the output member rotates about the drive axis DA. The output member 134R is supported at its radially outer ends by a bearing 136R extending around and engaging the interior of the hub portion 34. The bearing 136R provides additional strength and stability to the torque transmission assembly 64. The radially opposite ends of the output member 134R are bent to form lips 138R which extend around over the laterally inner side of the bearing 136R.

The foregoing description of the torque transmission assembly 64 has focused on the components to the right of the connector body 120. The input member 86L and output member 134L on the left side of the connector body 120 are of identical construction to the input member 86R and output member 134R on the right side. The output member 134R is mounted for rotation about the drive axis DA on the tubular shaft 80 mounted in the opening 58L of the left cover 68L of the hub portion 34. Thus, the left output member 134L does not put out torque to the sprocket gear 44, but serves to support the torque transmission assembly 64 in the hub portion 34.

As shown in FIG. 2, the input members 86R, 86L and output members 134R, 134L are thin, substantially flat and have opposing faces designated 140 and 142, respectively. The input members 86R, 86L and output members 134R, 134L are mounted with their faces perpendicular 140, 142 to the drive axis DA. The connector 100 extends between the laterally inner faces 140 of the input members, and is also thin and flat. Thus, the torque transmission assembly 64 has a thin profile, permitting the pedals 59R, 59L to be mounted at a conventional lateral spacing.

The cranks 54R, 54L, torque transmission assembly 64, sprocket gear 44 and chain 46, taken together, constitute the drive assembly of the bicycle 10. It is to be understood that the torque transmission assembly 64 is applicable to other rider propelled vehicles, including specifically those which are driven by reciprocating pedal action such as the vehicle shown in my co-pending U.S. application Ser. No. 96,649, filed Jul. 22, 1993.

A second embodiment of the bicycle, indicated generally at 210, is shown in FIG. 1A. The bicycle 210 is substantially the same as the bicycle 10 of the first embodiment. The corresponding parts of the bicycle 210 are indicated by the same reference numbers used for those parts in the first embodiment of the bicycle 10. The bicycle 210 of the second embodiment illustrates some changes to the conventional bicycle design which can be made as a result of the drive assembly described above. More specifically, the upper horizontal frame member 32 has been eliminated, making it easier to mount the bicycle. The seat 222 is positioned lower than the seat 22 of the first embodiment, and has a high back 22A. The high back 222A increases comfort and provides a reaction surface for the rider's body as he pushes against the pedals 59R, 59L. The seat 222 is mounted on the center post 24 and rear angled frame member 40 by a platform 222B which permits the seat, by manipulation of a lever 222C, to be adjusted forwardly and rearwardly as desired by the rider. An adjusted position of the seat 222 is shown in phantom in FIG. 1A. Thus, the rider may position his body more to the rear of the pedals 59R, 59L, which is more comfortable for pedalling.

Having described the construction of the drive assembly, its operation will now be explained with reference being made to FIGS. 7A–7D. The connector 100 is illustrated schematically in these figures as an elongate, inverted T. The lugs 122R, 122L are represented by circles at opposite ends of the T and the ear 126R connected to the output member 134R is represented by a circle at the intersection of the two lines forming the T. Lines (designated L1 and L2, respectively) extending between the lugs 122R, 122L and the drive axis DA illustrate the distance between each lug and the drive axis and the angular position of the lug. Line L3 illustrates the distance between the ear 126R and the drive axis DA as the ear travels in an orbit 0 about the drive axis. In general, operation of the torque transmission assembly 64 to accelerate and decelerate the cranks 54R, 54L is controlled by the varying position of the lugs 122R, 122L (which connect the input members 86R, 86L to the output member 134R) during a cycle of rotation of the output shaft 60. More specifically, as shown by FIGS. 7A–7D, the lugs 122R, 122L change their radial distance from the drive axis DA during a single cycle of rotation such that the speed of the input members 86R, 86L connected to the lugs changes in correspondence to the radial position of their corresponding lugs. However, the ear 126R connecting the connector 100 to the output member 134R is always positioned at a constant radial position relative to the drive axis DA. Thus, although the input members 86R, 86L (and hence cranks 54R, 54L) accelerate and decelerate during a single cycle of rotation, the speed of the output member 134R (and hence output shaft) is constant. In the preferred embodiment, the right crank 54R is always positioned 15° ahead of the angular position of the lug 122R, and the left crank 54L is always positioned 195° ahead of the lug 122L.

Figure 7A:
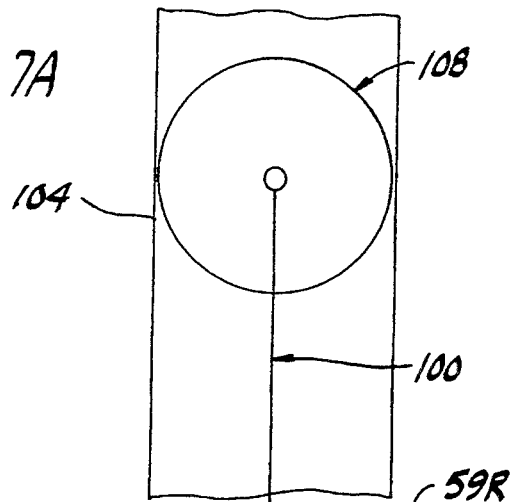
FIGS. 7A-7D are schematics illustrating the operation of the drive assembly.
Figure 7B:
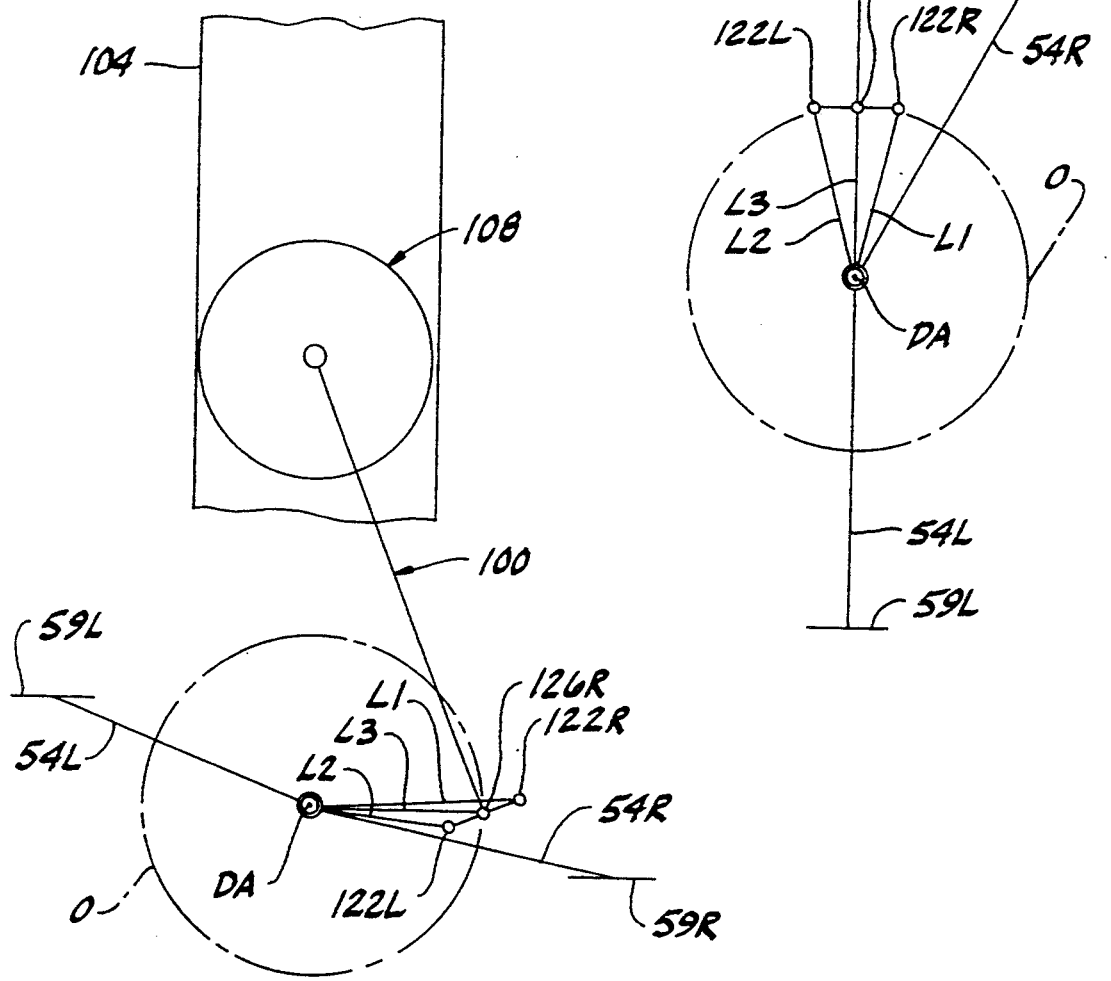

The drive assembly is shown in FIG. 7A in the same position illustrated in FIG. 1. The left crank 54L is in its bottom dead center position, the right crank 54R is approximately 30° past its top dead center position, and the output shaft 60 and output member 134R are at a 0° position. The angular location of the output shaft 60 and output member 134R are represented by the ear 126R in FIGS. 7A–7D, which rotates conjointly with the output shaft and output member. In the FIG. 7A position, the rider is applying force to the drive assembly through the right crank 54R. As the output shaft 60 is turned 90°, the rider drives the right crank 54R through angle of only approximately 71° to a position 101° past top dead center. The lug 122R connecting the right crank 54R to the output shaft 60 is located radially outward of the orbit 0 of the ear 126R as the output shaft is rotated from 0° (FIG. 7A) to 90° (FIG. 7B). However, the lug 122L connecting the left crank 54L to the output shaft 60 travels along a path which is radially inward of the orbit 0 of the ear 126R. As a result, left crank 54L travels 112° to a position approximately 292° past top dead center in the same time the output shaft 60 is turned 90° and the right crank 54R travels 71°. Thus, it may be seen that during the power stroke of the right crank 54R illustrated in FIGS. 7A and 7B, the right crank travels more slowly than the output shaft 60 and left crank 54L and the left crank travels faster than the output shaft and right crank.

As the right crank 54R travels an additional 79° to reach the end of its power stroke (i.e., at its bottom dead center position shown in FIG. 7C), the output shaft 60 is turned another 90°. Thus, during the power stroke of the right crank 54R, the output shaft 60 has made up the 30° by which it trailed the right crank and is now at the same angular location as the right crank. At the same time, the left crank 54L has travelled 98°, through its top dead center position, and to a location 30° past top dead center. The lugs 122R, 122L of both the right crank 54R and left crank 54L lie generally on the orbit 0 of the ear 126R, and so at the instant depicted in FIG. 7C the output shaft 60, right crank and left crank are travelling at the same speed.

Figure 7C:
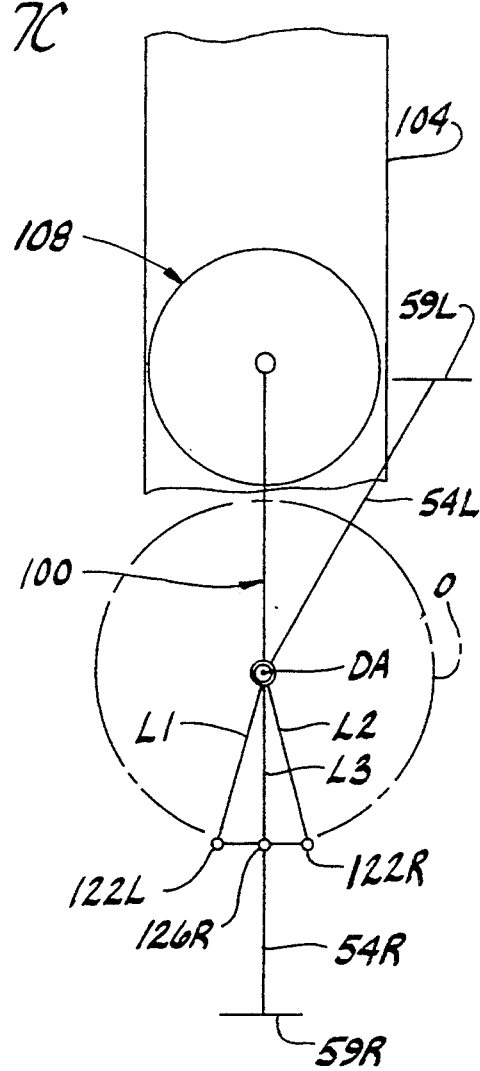
Figure 7D:
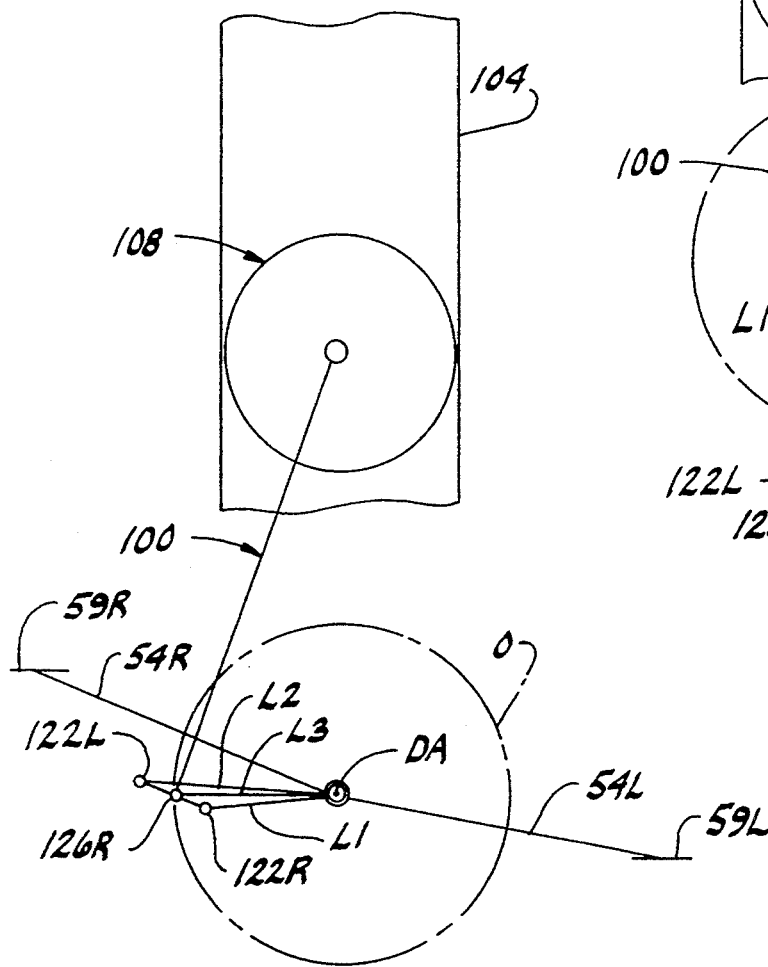

Subsequent to the time shown in FIG. 7C, until the left crank 54L returns to the bottom dead center position shown in FIG. 7A, the left crank travels more slowly than the output shaft 60 and right crank 54R, and the right crank travels faster than the output shaft and left crank. In FIG. 7D, the output shaft 60 has travelled another 90° to a location 270° from its start position. The left crank 54L rotates only 71°, but the right crank 54R is accelerated to rotate through an angle of 112° in this time. As may be seen in FIG. 7D, the radial location of the lugs 122R, 122L has been reversed from that of FIG. 7B. The lug 122L connected to the left crank 54L is now located outside the orbit 0 of the ear 126R and the lug 22R of the right crank 54R is located inwardly of the orbit of the ear. Thus, it may be seen that the torque transmission assembly 64 accelerates and decelerates the right and left cranks 54R, 54L relative to each other so that the cranks never simultaneously occupy their top and bottom dead center positions.

The connector 100 connecting the cranks 54R, 54L to the output member 134R via the input members 86R, 86L reciprocates up and down and swings in a front to rear direction of the bicycle 10 during each cycle of rotation of the output shaft 60. The lugs 122R, 122L are in a fixed position relative to each other and the ear 126R, and are held from rotation about the ear by the arm. The swinging motion of the connector 100 produces the cyclical variation in radial distance of the lugs 122R, 122L from the drive axis DA.

As will be understood, the path of each of the lugs 122R, 122L around the drive axis DA will not be circular, although the path of the openings 92R, 92L in the input members 86R, 86L in which they are connected will be circular. The disk 94R received in the opening 92R of the input member 86R and having an eccentric opening 98R with a bearing 124R for receiving the lug 122R permits the relative movement of the lug and input member during each cycle of rotation necessary to accommodate their differing orbital paths around the drive axis DA. The connection is made without the use of slots or cam followers (not shown) sliding in the slots which could cause wearing of the input member 86R or cam follower.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rider propelled vehicle comprising:
    a frame including a hub portion having two openings therein;
    at least two wheels mounted on the frame for rotation relative thereto, said at least two wheels including a drive wheel;
    two cranks, each having a crank shaft extending into the hub portion through a respective one of the openings, each crank shaft being mounted on the hub portion for rotation relative thereto independent of the other crank shaft, each crank being rotatable through a top dead center position and a bottom dead center position in which the force applied by the rider to the crank for propulsion of the vehicle is at a minimum;
    an output shaft extending from within the hub portion through one of the openings in the hub portion, the output shaft being operatively connected to the drive wheel for driving rotation of the drive wheel to propel the vehicle, the output shaft being mounted on the hub portion for rotation relative to the hub portion and the cranks;
    a torque transmission assembly interconnecting the output shaft with the crank shafts for transmitting torque from the crank shafts to the output shaft, the torque transmission assembly being contained within the frame and being constructed such that the cranks are accelerated and decelerated relative to each other whereby the cranks never simultaneously occupy their top and bottom dead center positions.

2. A rider propelled vehicle as set forth in claim 1 wherein the cranks are mounted for rotation of their crank shafts about a drive axis generally coincident with the longitudinal axes of the crank shafts, and wherein the axis of rotation and longitudinal axis of the output shaft generally coincides with the drive axis.

3. A rider propelled vehicle as set forth in claim 1 wherein the hub portion comprises a tube, a first generally thin, circular cover substantially closing a first end of he tube and a second generally thin, circular cover substantially closing a second end of the tube opposite the first, each of the covers having a generally central opening therein constituting one of the openings of the hub portion, and an annular flange extending around the perimeter of the central opening, the annular flange having an inner surface which bears the crank shaft.

4. A rider propelled vehicle as set forth in claim 1 wherein the torque transmission assembly comprises input members each attached to a corresponding crank shaft for conjoint rotation therewith about a drive axis, at least one output member mounted within the hub portion for conjoint rotation with the output shaft about the drive axis, and a connector connecting the input members and output member, the connector including connector portions attached to respective input members and adapted for rotation about the drive axis, each connector portion being attached to its respective input member for movement relative thereto between a location closer to the drive axis and a location farther from the drive axis during each rotation of the connector portion about the drive axis, the connector being attached to the output member at a location which remains at a fixed distance from the drive axis throughout each rotation of the connector about the drive axis.

5. A rider propelled vehicle as set forth in claim 4 wherein the input members and output member are each thin, substantially flat, and have opposing faces, the input members and output members being mounted with their opposing faces perpendicular to the drive axis.

6. A rider propelled vehicle as set forth in claim 5 wherein the connector includes a thin, substantially flat arm which extends between the laterally inner faces of the input members.

7. A rider propelled vehicle as set forth in claim 4 wherein the frame further includes a tubular raceway portion opening into the interior of the hub portion, and wherein the connector comprises an arm extending from the hub portion into the raceway portion for reciprocating in the raceway portion, the connector portions comprising lugs mounted at spaced apart locations on the arm, the lugs and arm being fixed in their relative locations to one another.

8. A rider propelled vehicle as set forth in claim 7 wherein the lugs are each connected to a respective one of the input members, the lugs being adapted for orbiting the drive axis and output shaft along paths which vary in their radial distance from the drive axis during a single orbit, the speed of rotation of each crank being varied in inverse proportion to the radial distance from the drive axis of the lug connected to the input member associated with that crank.

9. A rider propelled vehicle as set forth in claim 8 wherein the connector further comprises a roller connected to the arm at an end of the arm disposed within the tubular frame member to facilitate reciprocation of the arm in the tube.

10. A rider propelled vehicle as set forth in claim 8 wherein the input members each include a generally circular opening spaced from the drive axis, a turn plate mounted within the opening for turning about an axis passing through the center of the opening, the turn plate having an eccentric opening therein, and bearing means disposed in the eccentric opening receiving one of the lugs of the connector therein and permitting the lug to turn relative to the turn plate whereby variation of the radial distance of the lugs from the drive axis is achieved without use of linear, sliding motion of the lugs in the input members.

11. A rider propelled vehicle as set forth in claim 10 wherein the cranks each have pedals mounted on their outer ends, the pedals being adapted for engagement by the rider for applying a motive force to the cranks.

12. A drive assembly for a rider propelled vehicle having a frame and wheels mounted on the frame for rotation relative to the frame, the drive assembly comprising:

two cranks, each having a crank shaft mounted on the frame for rotation relative thereto independent of the other crank shaft, each crank being rotatable through a top dead center position and a bottom dead center position in which the force applied by the rider to the crank for propulsion of the vehicle is at a minimum;

an output shaft operatively connected to one of the wheels of the vehicle for driving rotation of said one wheel to propel the vehicle, the output shaft being mounted on the frame for rotation relative to the frame and the cranks;

the cranks being mounted for rotation of their crank shafts about a drive axis generally coincident with the longitudinal axes of the crank shafts, the axis of rotation and longitudinal axis of the output shaft generally coinciding with the drive axis;

a torque transmission assembly interconnecting the output shaft with the crank shafts for transmitting torque from the crank shafts to the output shaft, the torque transmission assembly being constructed such that the cranks are accelerated and decelerated relative to each other whereby the cranks never simultaneously occupy their top and bottom dead center positions.

13. A drive assembly as set forth in claim 12 wherein the torque transmission assembly comprises input members each attached to a corresponding crank shaft for conjoint rotation therewith, at least one output member mounted for conjoint rotation with the output shaft, and a connector connecting the input members and output member, the connector including connector portions attached to respective input members and adapted for rotation about the drive axis, each connector portion being attached to its respective input member for movement relative thereto between a location closer to the drive axis and a location farther from the drive axis during each rotation of the connector portions about the drive axis, the connector being attached to the output member at a location which remains at a fixed distance from the drive axis throughout each rotation of the connector about the drive axis.

14. A drive assembly as set forth in claim 13 wherein the input members and output member are each thin, substantially flat, and have opposing faces, the input members and output members being mounted with their opposing faces perpendicular to the drive axis.

15. A drive assembly as set forth in claim 14 wherein the connector includes a thin, substantially flat arm which extends between the laterally inner faces of the input members.

16. A drive assembly as set forth in claim 13 wherein the connector comprises an arm extending outwardly from the input members and output member, the arm being adapted for generally reciprocating motion, the connector portions comprising lugs mounted at spaced apart locations on the arm, the lugs and arm being fixed in their relative locations to one another.

17. A drive assembly as set forth in claim 16 wherein the lugs are each connected to a respective one of the input members, the lugs being adapted for orbiting the drive axis and output shaft along paths which vary in their radial distance from the drive axis during a single orbit, the speed of rotation of each crank being varied in inverse proportion to the radial distance from the drive axis of the lug connected to the input member associated with that crank.

18. A drive assembly as set forth in claim 17 wherein the connector further comprises a roller connected to the arm at an end of the arm adapted to facilitate reciprocation of the arm.

19. A drive assembly as set forth in claim 17 wherein the input members each include a generally circular opening spaced from the drive axis, a turn plate mounted within the opening for turning about an axis passing through the center of the opening, the turn plate having an eccentric opening therein, and bearing means disposed in the eccentric opening receiving one of the lugs of the connector therein and permitting the lug to turn relative to the turn plate whereby variation of the radial distance of the lugs from the drive axis is achieved without use of linear, sliding motion of the lugs in the input members.

20. A drive assembly as set forth in claim 19 wherein the cranks each have pedals mounted on their outer ends, the pedals being adapted for engagement by the rider for applying a motive force to the cranks.

* * * * *